United States Patent [19]

Mitchell

[11] Patent Number: 4,613,863
[45] Date of Patent: Sep. 23, 1986

[54] ELECTRONIC AUGMENTATION OF RADAR TARGETS

[75] Inventor: Richard L. Mitchell, Rolling Hills Estates, Calif.

[73] Assignee: Mark Resources, Inc., Santa Monica, Calif.

[21] Appl. No.: 293,155

[22] Filed: Aug. 17, 1981

[51] Int. Cl.$^4$ .............................................. G01S 7/40
[52] U.S. Cl. ...................................... 343/17.7; 434/2
[58] Field of Search ............ 343/6.8 R, 6.8 LC, 18 R, 343/18 E, 17.7, 5 ST; 434/2, 5

[56] References Cited

U.S. PATENT DOCUMENTS

| | | | |
|---|---|---|---|
| 3,214,758 | 10/1965 | Mills et al. | 343/17.7 |
| 3,258,770 | 6/1966 | Rapsilber | 434/2 |
| 3,504,366 | 3/1970 | Tolles et al. | 343/18 R |
| 3,760,418 | 9/1973 | Cash et al. | 343/18 D |
| 3,898,662 | 8/1975 | Hom et al. | 343/18 E |
| 3,982,244 | 9/1976 | Ward et al. | 343/17.7 X |
| 4,117,484 | 9/1978 | Shizume | 343/18 E |
| 4,307,400 | 12/1981 | Miley | 343/18 E |
| 4,328,496 | 5/1982 | White | 343/18 E |

Primary Examiner—Salvatore Cangialosi
Assistant Examiner—K. R. Kaiser
Attorney, Agent, or Firm—Blakely, Sokoloff, Taylor & Zafman

[57] ABSTRACT

Apparatus and methods are disclosed in which a radar target can be electronically disguised to appear like another target.

The technique is based on the generation of a desired synthetic target signature that is superimposed on the normal radar echo for the simulation platform. The simulation system consists of multiple antennas with tapped delay lines and signal modulators to provide the means of generating the desired target signal that is extended in angle and range. It is possible to utilize very realistic models of the desired target; the necessary information can be collected on a high-resolution measurement range. The general technique works against any pulsed radar in a monostatic geometry. A modified technique for operation against continued wave and bistatic radars is also discussed. The applications of the technique include the testing of missileborne guidance radars against cooperative targets and electronic countermeasures (ECM) applied to a target vehicle to deceive the radar. In either case, the physical target will be electronically augmented so that it appears like an entirely different target to the radar.

43 Claims, 7 Drawing Figures

ELECTRONIC AUGMENTATION OF RADAR TARGETS

BACKGROUND OF THE INVENTION

1. Field of the Invention

The present invention relates to the field of radar.

2. Prior Art.

Techniques have recently been developed for modeling radar targets in a highly realistic manner. With these models it has also been possible to simulate replicas of radar signals that are reflected from such targets, making it possible to test airborn guidance radars against simulated targets.

Modern radars see targets as more than just a point on a display. Most radars have the capability to measure in 3-dimensions the location of the apparent center of reflection on the target, and some radars can resolve the target in the range dimension into several distinct features. Some radars can even analyze the signal dynamics and the relative sizes of the reflected signal in each resolution cell to discriminate one target from another. All of these properties constitute the target signature. The dynamics of the signature are especially important, because small targets will not behave as large ones.

Several attempts have been made to augment the radar signature of targets. They fall into two categories: passive and active. Passive techniques consist of the placement of reflecting devices on or about the target platform to create additional scattering centers. Such techniques are inexpensive, but they are also extremely limited; for example, it will not be possible to simulate a target that is physically larger than the simulation platform. Active techniques include all methods of electronically amplifying, delaying, or modifying the intercepted radar signal prior to retransmission of the signal back to the radar. It is only these techniques that have the full potential to realistically simulate radar targets.

BRIEF SUMMARY OF THE INVENTION

Apparatus and methods are disclosed in which a radar target can be electronically disguised to appear like another target.

The technique is based on the generation of a desired synthetic target signature that is superimposed on the normal radar echo for the simulation platform. The simulation system consists of multiple antennas with tapped delay lines and signal modulators to provide the means of generating the desired target signal that is extended in angle and range. It is possible to utilize very realistic models of the desired target; the necessary information can be collected on a high-resolution measurement range. The general technique works against any single pulsed radar in a monostatic geometry. A modified technique for operation against continuous wave and bistatic radars is also discussed.

The applications of the technique include the testing of missileborne guidance radars against cooperative targets and electronic countermeasures (ECM) applied to a target vehicle to deceive the radar. In either case, the physical target will be electronically augmented so that it appears like an entirely different target to the radar.

DETAILED DESCRIPTION OF THE INVENTION

Figure 1:
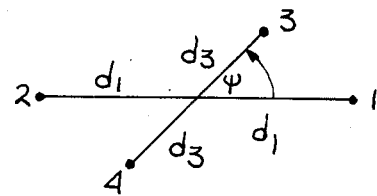
FIG. 1 is an illustration of a four antenna system antenna geometry as viewed by the radar

The methods and apparatus described herein with respect to preferred embodiments of the invention involve the modulation and retransmission of the radar signal intercepted by the simulation system. The modulation signals are derived from a specific target model that is stored in a digital data base. Because of the flexibility of the digital format there is complete generality in the type of targets and the detail that can be accommodated by this procedure. With these techniques it will be possible to simulate a realistic signature of any target. Moreover, a large target can be simulated on a small simulation platform.

The active target simulation techniques described in detail herein are based on the use of multiple antennas to simulate target extent in angle, and tapped delay lines to simulate range extent. Modulation signals are applied to the outputs of the tapped delay lines, and these outputs are summed prior to retransmission, to simulate the desired target. The modulation signals that are derived from a basic mathematical model of the target are generated in real time according to the dynamics of the engagement geometry.

One potential problem of any augmentation scheme is the difference between the dynamics of the simulation platform and the desired target. If no compensation for the platform dynamics is implemented the simulated signature will have the dynamic properties of the platform, not the desired target. Thus it is imperative to compensate for the platform motion. The compensation must be in the form of a phase shift applied at each antenna to account for rotations (roll, pitch, and yaw) of the simulation platform. These rotations can be measured either mechanically or electronically, and the compensating phase derived therefrom. In addition, a simpler and better method that automatically compensates for the platform rotations is disclosed. However, for this method the radar must be monostatic (i.e., the transmitter and receiver must be collocated), and the radar waveform must be pulsed. Extensions to the bistatic geometry and a continuous wave (cw) radar are also discussed. However, for the initial discussion, it will be assumed that the radar is pulsed and is operating in a monostatic geometry. Also, it will be assumed that the simulation platform lies within the linear region of the radar monopulse antenna beam (or equivalent angle measuring system).

TARGET MODELS

The reflection of a radar signal on a complex target occurs at many points on the target, which are called scattering centers or scatterers. With a low-resolution radar, in which the target is physically smaller than the radar resolution cell in all dimensions, the reflected signals interfere with each other, producing a fluctuation or scintillation in the amplitude of the received signal and a wandering or glint of the apparent center of reflection. With an appropriate model of scintillation and glint one can replace the actual target with an equivalent point scatterer, and the radar will be unable to sense the difference. The amplitude (of the reflection coefficient) and location of the scatterer will be time-varying functions according to the target model and relative geometry between the radar and target.

Some radars have a range resolution cell that is smaller than the target, so that the target appears to be extended over several range cells. In this high-resolution situation scatterers will still interfere within a range cell, but not from one range cell to another. Again, with an appropriate model of the scintillation and glint that takes place within each range cell one can replace the actual target with a set of equivalent point scatterers, one scatterer for each range cell, and the radar will be unable to sense the difference. In general, the scintillation and glint will be different for each range cell.

The successful implementation of the target signature simulation techniques described herein depends on realistic mathematical models of the desired targets. For low-resolution applications, a specification of the scintillation amplitude and glint wander, possibly in as many as three dimensions, is needed. Since these quantities are extremely sensitive to the target aspect angle, it is often difficult to construct realistic models that specify scintillation and glint directly.

For high-resolution applications, a description of the significant scattering centers, specifically their amplitudes and locations as a function of the target aspect angle is needed. Fortunately, these parameters are less sensitive to the target aspect angle so that realistic models can be readily constructed. Moreover, it is possible to use the high-resolution models in low-resolution applications.

The parameters that describe the significant scattering centers as a function of target aspect angle can be established by measurement. A large-bandwidth pulse radar will provide high resolution in range, and by coherently processing the pulse returns for a rotating target one can obtain high angular resolution in the plane of rotation. Establishing the location of the scattering centers out of the plane of rotation is most easily accomplished by associating them with physical target features.

SIMULATING EXTENDED TARGETS

At a given target aspect angle, the target model will specify the significant scattering centers in terms of the amplitude ($A_k$) and location ($X_k, Y_k, Z_k$) in target coordinates. Amplitude will be the square root of radar cross section (RCS), which is the power scattered in the direction of the radar relative to the incident power density. In complete generality a phase reflection coefficient should also be specified for each scattering center; however, slight variations or uncertainties in the location of a scattering center (of the order of a half-wavelength) will completely mask any inherent phase shift. Moreover, the radar will not be sensitive to the absolute phase of the scattering center, so no generality is lost by omitting it.

In the use of a target model for simulating signals, the first task will be to transform target coordinates (X, Y, Z) for each scatterer to the radar oriented coordinate system of range (r), azimuth ($\alpha$), and elevation ($\epsilon$). The orientation of the latter two quantities is arbitrary, but the coordinate system must be orthogonal. As long as the range is not too short one can compute projections of each scattering center onto the radar coordinates that are referenced to the target center of gravity.

RESAMPLING IN RANGE

The scattering centers will occur at arbitrary ranges. In practice, the ranges of the scattering centers must be constrained to coincide with uniformly spaced samples. Thus the scattering centers must be resampled in range. One procedure that can be implemented simply is to create two new scatterers on the set of uniformly spaced samples, with the amplitude and phase given by Scatterer at range $r_i$: $A[1-(r-r_i)/\Delta r]e^{-j4\pi(r-r_i)/\lambda}$ (1)

Scatterer at range $r_i + \Delta r$:
$A[(r-r_i)/\Delta r]e^{j4\pi(r_i+\Delta r-r)/\lambda}$ (2)

where A is the amplitude of the original scatterer, $\Delta r$ is the range sample spacing, and $r_i \leq r \leq r_i + \Delta r$. The phase terms are necessary to account for the change in range. The two new scatterers will be essentially unresolvable by the radar, and indistinguishable from the original one, if $\Delta r$ is less than the range resolution cell size. A slight simplification results if $\Delta r$ is constrained to be an integer multiple of $\lambda/2$: the phase term for the new scatterer in (2) is then identical to that in (1).

For a target model containing multiple scatterers the above resampling will be performed on each scatterer. The effects of glint must also be taken into account. The following sequences will contain all scintillation and glint information as a function of range:

$$\Sigma_o(i) = \sum_k A_k \omega(r_k - r_i) e^{-j4\pi(r_k-r_i)/\lambda} \quad (3)$$

$$\Sigma_\alpha(i) = \sum_k A_k \alpha_k \omega(r_k - r_i) e^{-j4\pi(r_k-r_i)/\lambda} \quad (4)$$

$$\Sigma_\epsilon(i) = \sum_k A_k \epsilon_k \omega(r_k - r_i) e^{-j4\pi(r_k-r_i)/\lambda} \quad (5)$$

where $\omega(r)$ is a range resampling function given by $$\left. \begin{array}{l} \omega(r) = 1 - |r|/\Delta r, \; |r| \leq \Delta r \\ = 0 \quad\quad\quad\quad\quad, \text{otherwise} \end{array} \right\} \quad (6)$$

and $\Delta r$ is constrained to be an integer multiple of $\lambda/2$. If it is assumed that the radar antenna is aligned with the ($\alpha, \epsilon$) axes, equation (3) can be interrupted as the modulation signal received by the monopulse sum channel, (4) as the modulation signal received by the monopulse azimuth-difference channel, and (5) as the modulation signal received by the monopulse elevation-difference channel.

SIMULATING ANGULAR EXTENT IN ONE DIMENSION

One can simulate a glinting signal in angle by radiating from two antennas on the simulation platform. First, assume that the radar range resolution is low so that there is no target range extent. Next assume that the range to each antenna is either identical, or else there is phase compensation to make them appear to be at the same range. The azimuth plane will be defined by the two antennas, with signal amplitudes $U_1$ and $U_2$ being radiated from the antennas at aximuth angles $\hat{\alpha}_1$ and $\hat{\alpha}_2$, respectively. Without range extent, (3) and (4) can be rewritten as:

$$\Sigma_o = \sum_k A_k e^{-j4\pi r_k/\lambda} \quad (7)$$

$$\Sigma_\alpha = \sum_k \alpha_k A_k e^{-j4\pi r_k/\lambda} \quad (8)$$

In order to simulate the proper signals from the two antennas, set $$\Sigma_o = U_1 + U_2 \quad (9)$$

$$\Sigma_\alpha = \hat{\alpha}_1 U_1 + \hat{\alpha}_2 U_2 \quad (10)$$

which gives two equations to solve for the two unknowns, $U_1$ and $U_2$. The solution is $$U_1 = \frac{\Sigma_\alpha - \hat{\alpha}_2 \Sigma_o}{\hat{\alpha}_1 - \hat{\alpha}_2} \quad (11)$$

$$U_2 = \frac{\hat{\alpha}_1 \Sigma_o - \Sigma_\alpha}{\hat{\alpha}_1 - \hat{\alpha}_2} \quad (12)$$

The apparent center of radiation can be measured by the radar as $$\bar{\alpha} = Re\{\Sigma_\alpha/\Sigma_o\} \quad (13)$$

Although (7) and (8) are complex quantities, in general, assume that they are real for the moment, in which case $$\bar{\alpha} = (\hat{\alpha}_1 U_1 + \hat{\alpha}_2 U_2)/(U_1 + U_2) \quad (14)$$

Thus in terms of scintillation, $\Sigma_o$, and glint $\alpha$, the real signals are $$U_1 = (\bar{\alpha} - \hat{\alpha}_2)\Sigma_o/(\hat{\alpha}_1 - \hat{\alpha}_2) \quad (15)$$

$$U_2 = (\hat{\alpha}_1 - \bar{\alpha})\Sigma_o/(\hat{\alpha}_1 - \hat{\alpha}_2) \quad (16)$$

Note that it is possible to simulate a glinting signal that lies outside of the interval ($\hat{\alpha}_1, \hat{\alpha}_2$). There is no theoretical limit on the extent of angular glint that can be simulated, a result that also applies for the complex signals.

So far, it has been assumed that the phase has been compensated on each antenna so that both appear to be at the same range to the radar. If the phases are not compensated the signals from each antenna will interfere with each other, creating an entirely different target signature than the one desired. It would be possible to measure the angle of arrival of the incoming wavefront and control the phases thereby, but a simpler method exists that does not require an accurate measurement system. This method will be discussed herein under the heading Low-Resolution Procedure for Two Antennas.

SIMULATING ANGULAR EXTENT IN TWO DIMENSIONS

The above method is capable of simulating angular glint only along the line connecting the two antennas. Many targets can be realistically simulated in this manner, but others will require a glinting signal in two dimensions. In order to simulate a target that is extended in azimuth as well as elevation, signals must be radiated from at least three antennas that are displaced from each other and are not collinear. Since a solution exists for three antennas, it will be assumed for the moment that there are only three.

Define the angular position of the three antennas, as viewed by the radar and in polar coordinates relative to some point on the target, as $(d_1,\theta_1)$, $(d_2,\theta_2)$, and $(d_3,\theta_3)$, where $d_n$ is measured in the same units as $(\alpha,\epsilon)$. Also define $$C_n = d_n \cos \theta_n \quad (17)$$

$$S_n = d_n \cos \theta_n \quad (18)$$

for $n = 1, 2$, and $3$. Note that these quantities are functions of the aspect angle of the simulation platform as viewed by the radar.

The simulation system will generate three modulation signals ($U_1$, $U_2$, and $U_3$) corresponding to the three antennas. First define $$\Sigma_\epsilon = \sum_k \epsilon_k A_k e^{-j4\pi r_k/\lambda} \quad (19)$$

to supplement (7) and (8). Then the three modulation signals are given by the solution of the following matrix equation (assuming no range extent):

$$\begin{bmatrix} 1 & 1 & 1 \\ C_1 & C_2 & C_3 \\ S_1 & S_2 & S_3 \end{bmatrix} \begin{Bmatrix} U_1 \\ U_2 \\ U_3 \end{Bmatrix} = \begin{Bmatrix} \Sigma_o \\ \Sigma_\alpha \\ \Sigma_\epsilon \end{Bmatrix} \quad (20)$$

In general, the orientation of the radar antenna will be unknown. Let $\theta$ be a clockwise rotation of the $(\alpha,\epsilon)$ axes to the radar $(\alpha',\epsilon')$ axes. Note that $$\alpha' = \alpha \cos \phi - \epsilon \sin \phi \quad (21)$$

$$\epsilon' = \alpha \sin \phi + \epsilon \cos \phi \quad (22)$$

The three monopulse signals that should be received by the radar are obtained in substituting $\alpha'$ and $\epsilon'$ in (3) through (5) for $\alpha$ and $\epsilon$. With the use of (21) and (22)

$$\begin{Bmatrix} \Sigma_o' \\ \Sigma_\alpha' \\ \Sigma_\epsilon' \end{Bmatrix} = \begin{bmatrix} 1 & 0 & 0 \\ 0 & \cos\phi & -\sin\phi \\ 0 & \sin\phi & \cos\phi \end{bmatrix} \begin{Bmatrix} \Sigma_o \\ \Sigma_\alpha \\ \Sigma_\epsilon \end{Bmatrix} \quad (23)$$

The signals that are actually received by the radar are $$\begin{Bmatrix} \Sigma_o' \\ \Sigma_\alpha' \\ \Sigma_\epsilon' \end{Bmatrix} = \begin{bmatrix} 1 & 1 & 1 \\ C_1' & C_2' & C_3' \\ S_1' & S_2' & S_3' \end{bmatrix} \begin{Bmatrix} U_1 \\ U_2 \\ U_3 \end{Bmatrix} \quad (24)$$

where $$C_n' = d_n \cos (\theta_n + \phi) \quad (25)$$

$$S_n' = d_n \sin (\theta_n + \phi) \quad (26)$$

for $n = 1, 2$, and $3$. Solving (20) for the modulation signals $U_n$ and substituting the result into (24)

$$\left\{ \begin{array}{c} \Sigma_o' \\ \Sigma_a' \\ \Sigma_\epsilon' \end{array} \right\} = \left[ \begin{array}{ccc} 1 & 1 & 1 \\ C_1' & C_2' & C_3' \\ S_1' & S_2' & S_3' \end{array} \right] \left[ \begin{array}{ccc} 1 & 1 & 1 \\ C_1 & C_2 & C_3 \\ S_1 & S_2 & S_3 \end{array} \right]^{-1} \left\{ \begin{array}{c} \Sigma_o \\ \Sigma_a \\ \Sigma_\epsilon \end{array} \right\} \quad (27)$$

Equation (27) will be identical to (23) if $$\left[ \begin{array}{ccc} 1 & 1 & 1 \\ C_1' & C_2' & C_3' \\ S_1' & S_2' & S_3' \end{array} \right] = \left[ \begin{array}{ccc} 1 & 0 & 0 \\ 0 & \cos\phi & -\sin\phi \\ 0 & \sin\phi & \cos\phi \end{array} \right] \left[ \begin{array}{ccc} 1 & 1 & 1 \\ C_1 & C_2 & C_3 \\ S_1 & S_2 & S_3 \end{array} \right] \quad (28)$$

This result is just an expansion of the expressions in (25) and (26). These equations demonstrate that prior knowledge of $\phi$, the relative orientation of the radar antenna axes, is not necessary in order to implement this simulation procedure. The only requirement will be that the three simulation antennas be in the linear region of the radar monopulse antenna.

Four or more antennas can also be used to simulate a target that is extended in angle. This is discussed in greater detail under the heading Low-Resolution Procedure for Four Antennas, wherein it is shown that the four-antenna solution will turn out to be the most practical for implementation when the simulation system is moving with respect to the radar. The four modulation signals $\{U_n\}$ cannot be uniquely determined, but they must nevertheless satisfy $$\left[ \begin{array}{cccc} 1 & 1 & 1 & 1 \\ C_1 & C_2 & C_3 & C_4 \\ S_1 & S_2 & S_3 & S_4 \end{array} \right] \left\{ \begin{array}{c} U_1 \\ U_2 \\ U_3 \\ U_4 \end{array} \right\} = \left\{ \begin{array}{c} \Sigma_o \\ \Sigma_a \\ \Sigma_\epsilon \end{array} \right\} \quad (29)$$

So far it has been assumed that the target has no range extent. If it does, then the modulation signals at each antenna become functions of range (delay) as $U_n(i)$ where the argument i designates the range sample number. Instead of using $\Sigma_o$, $\Sigma_a$, and $\Sigma_\epsilon$ defined by (7), (8), and (19), the range dependent expressions in (3) through (5) must be used to solve for $U_n(i)$.

COMPENSATING FOR PLATFORM MOTION

Earlier in this disclosure, various forms of the modulation signals that are to be induced on the radar signal to simulate an extended target were derived. Two or more antennas are required to simulate angular glint, and some method of adding range extent is necessary for range extended targets. In order to apply these modulation signals the radar signal must be intercepted to get certain information prior to generating or retransmitting the desired signals back to the radar. First, approximate angle-of-arrival information is needed to get the target scattering parameters ($A_k$, $X_k$, $Y_k$, $Z_k$,) from the target data base. Second, timing information is needed in order to synchronize the simulated signal with the radar. Third, depending on how the procedure is implemented, accurate angle-of-arrival information might be needed in order to compensate the phase on each antenna for range differences. Finally, if little is known in real time about the signal transmitted by the radar, the whole signal must be intercepted for retransmission by the simulation system. The two biggest problems in implementation are likely to be an accurate measurement of angle of arrival and the isolation between receive and retransmit on the simulation platform. The latter can best be handled by a suitable delay prior to retransmission. The former is best handled by a procedure that is described next. It will be assumed for the moment that the target is not extended in range and there are only two antennas.

LOW-RESOLUTION PROCEDURE FOR TWO ANTENNAS

If the signal intercepted by one antenna can be retransmitted by the other, and vice versa, the total path lengths for the two signals will be identical, regardless of the relative geometry between the simulation platform and the radar. Thus no phase compensation for angle of arrival will be required.

Let $r_1$ and $r_2$ be the ranges to antennas 1 and 2, respectively. The relative voltages in complex notation that are intercepted by the two antennas will be proportional to $$V_{I1} = e^{jkr_1} \quad (30)$$

$$V_{I2} = e^{jkr_2} \quad (31)$$

where $$k = -2\pi/\lambda \quad (32)$$

and $\lambda$ is the radar wavelength for an assumed narrowband signal. Next, amplify the signal intercepted at antenna 1 and retransmit it at antenna 2; similarly, the signal intercepted at antenna 2 will be amplified and retransmitted at antenna 1. For the moment, ignore the problem of trying to receive and transmit simultaneously on the same antenna. The two retransmitted signals are $$V_{T1} = U_1 V_{I2} = U_1 e^{jk(r_2 + l)} \quad (33)$$

$$V_{T2} = U_2 V_{I1} = U_2 e^{jk(r_1 + l)} \quad (34)$$

where l is the distance between the two antennas (plus any extra delay) and the amplification coefficients (modulation signals) are designated by $U_1$ and $U_2$. The received signal components at the radar are $$V_{R1} = V_{T1} e^{jkr_1} = U_1 e^{jk(r_1 + r_2 + l)} \quad (35)$$

$$V_{R2} = V_{T2} e^{jkr_2} = U_2 e^{jk(r_1 + r_2 + l)} \quad (36)$$

where an amplitude scale factor has been neglected. Note that both signal components have the same total path length, and consequently, the same phase. This phase is independent of the relative orientation of the two antennas with respect to the radar.

For the above technique the total signal path length is the same for both components, $r_1 + r_2 + l$. If a low-resolution radar is capable of measuring range, then it will be given by half of this path length, or $(r_1 + r_2 + l)/2$. In order to simulate a variable, glinting range, one can add a variable delay to both signal paths. However, a variable delay is difficult to implement in practice. A better method of simulating range glint is subsequently discussed as a special case of the procedure for high resolution.

The above technique automatically compensates for the variable differential delay (or phase) to each antenna as the platform rotates. However, the absolute delay that applies to the composite signal from both antennas is still subject to variations as the target rotates unless the two antennas are placed so that the platform center of rotation approximately coincides with the midpoint between the antennas.

LOW-RESOLUTION PROCEDURE FOR THREE ANTENNAS

At least three antennas are required to simulate angular glint in two dimensions. For three antennas one could apply the foregoing results three times to paired combinations of the three antennas to obtain three effective scattering centers. However, a simpler scheme that is essentially equivalent is to receive on antenna 1, amplify, and retransmit on antenna 2; receive on 2, amplify, retransmit on 3; and receive on 3, amplify, and retransmit on 1. The three intercepted signals will be designated as $$V_{In} = e^{jkr_n} \quad (37)$$

for n=1, 2, and 3, and $r_n$ is the range to the $n^{th}$ antenna. The retransmitted signals are $$V_{T1} = U_1 V_{13} e^{jk(r3 + l31)} \quad (38)$$

$$V_{T2} = U_2 V_{I1} e^{jk(r1 + l12)} \quad (39)$$

$$V_{T3} = U_3 V_{12} e^{jk(r2 + l23)} \quad (40)$$

and $l_{ij}$ is the distance between antennas i and j. The received signal components at the radar are $$V_{R1} = V_{T1} e^{jkr1} = U_1 V_{13} e^{jk(r3 + r1 + l31)} \quad (41)$$

$$V_{R2} = V_{T2} e^{jkr2} = U_2 V_{I1} e^{jk(r1 + r2 + l12)} \quad (42)$$

$$V_{R3} = V_{T3} e^{jkr3} = U_3 V_{12} e^{jk(r2 + r3 + l23)} \quad (43)$$

However, note that the total signal paths for the signal components are no longer equal, nor can they be configured to eliminate the need for angle-of-arrival measurement and subsequent phase compensation. With such a measurement system, as subsequently discussed, the three-antenna scheme is entirely practical; without it one must either accept the limited performance of a two-antenna scheme, or else use a four-antenna system as is discussed next.

LOW-RESOLUTION PROCEDURE FOR FOUR ANTENNAS

In this case, position two of the four antennas on the simulation platform so that the midpoint of a line connecting them is coincident with the center of rotation of the platform. (The center of gravity may or may not correspond to the center of stability or the center of rotation.) The other two antennas will be similarly positioned, but all four antennas must not be collinear, nor in the same plane that contains the radar. For each pair, the signal will be received on one antenna and retransmitted on the other. If antennas 1 and 2 are paired, and 3 and 4 are paired, then one can designate the received signal components at the radar as $$V_{R1} = U_1 V_{I2} e^{jk(r1 + r2 + l12)} \quad (44)$$

$$V_{R2} = U_2 V_{I1} e^{jk(r1 + r2 + l12)} \quad (45)$$

$$V_{R3} = U_3 V_{I4} e^{jk(r3 + r4 + l34)} \quad (46)$$

$$V_{R4} = U_4 V_{I3} e^{jk(r3 + r4 + l34)} \quad (47)$$

Because of the way the antennas are positioned about the platform center of rotation $$r_1 + r_2 = r_3 + r_4 = 2r_o \quad (48)$$

where $r_o$ is the range to the platform center of rotation. Now if $l_{12} = l_{34}$, the total path length on all signal components will be identical. Equation (29) can be used to solve for the modulation signals $\{U_n\}$. Since one more equation is needed, it is suggested that one arbitrarily set $$U_1 + U_2 = U_3 + U_4 \quad (49)$$

to balance the two paired antennas.

Let us view the four antennas from the radar as shown in FIG. 1, with azimuth ($\alpha$) being defined along the line between antennas 1 and 2. The apparent separation of antennas 1 and 3 from the center of rotation is designated as $d_1$ and $d_3$, respectively, so that from (17) and (18)

$$
\begin{aligned}
C_1 &= d_1 & S_1 &= 0 \\
C_2 &= -d_1 & S_2 &= 0 \\
C_3 &= d_2 \cos\psi & S_3 &= d_3 \sin\psi \\
C_4 &= -d_2 \cos\psi & S_4 &= -d_3 \sin\psi
\end{aligned}
$$

where $\psi$ is the apparent angle between the two antenna axes. With (29) and (49) one can solve for the modulation signals as $$U_1 = \Sigma_o/4 + \Sigma_a 2d_1 - C\Sigma_\epsilon/2Sd_1 \quad (50)$$

$$U_2 = \Sigma_o/4 - \Sigma_a/2d_1 + C\Sigma_\epsilon/2Sd_1 \quad (51)$$

$$U_3 = \Sigma_o/4 + \Sigma_\epsilon/2Sd_3 \quad (52)$$

$$U_4 = \Sigma_o/4 - \Sigma_\epsilon/2Sd_3 \quad (53)$$

where $C = \cos\psi$ and $S = \sin\psi$.

PROCEDURE FOR HIGH RESOLUTION

Figure 2:
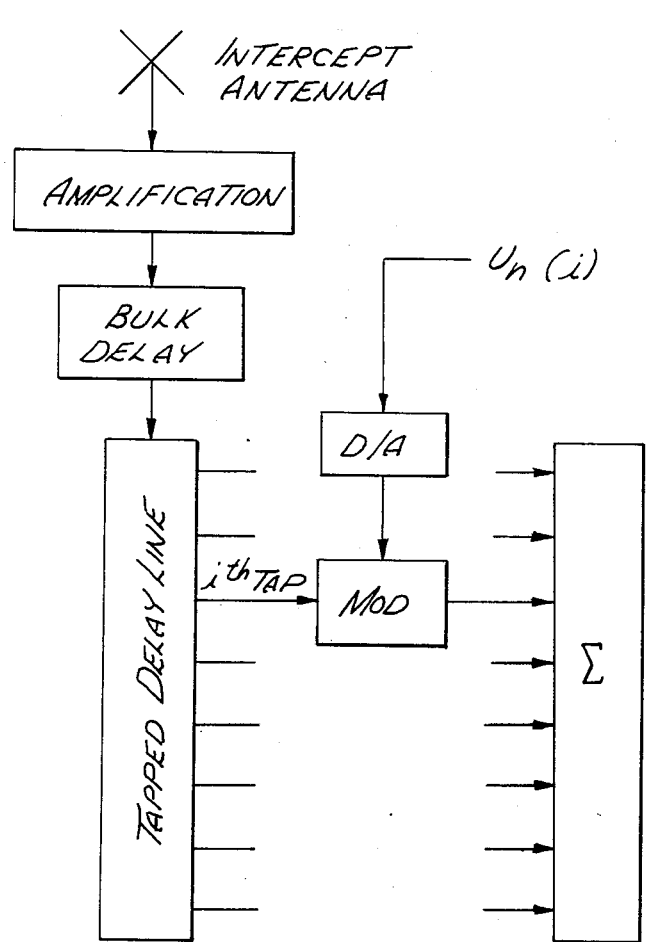
FIG. 2 is a block diagram illustrating a high resolution signal modulation scheme

If a target is extended over several range resolution cells it is possible to simulate the target response in each range gate of the radar receiver. First, assume that the range gate timing in the receiver is known to the simulation system, as well as the range, r. Prior to retransmitting the signals from the antennas on the simulation platform, they will be passed through tapped delay lines as shown in FIG. 2. The tap spacing will be identical to the delay between range gates. The outputs of each tap will be amplitude and phase modulated by the modulation signals $\{U_n(i)\}$, as previously defined. The resulting signals will then be summed and transmitted through the corresponding antennas.

In general, the timing in the radar receiver will not be known to the simulation system. The above procedure can still be used, but there will be significant errors introduced whenever there is a misalignment between the tapped delay line and the receiver range gates. This error can be reduced by spacing the taps more closely together, but at the expense of more taps to cover the extended target. A reasonable compromise is to have a tap spacing that is half of the range gate spacing. The errors as a function of tap spacing are derived in part in "Tap Weight Computations: A Simplified Approach, "Mark Resources, Inc. Report 185-14 (U.S. Army Missile Command, Huntsville, Ala., RFSS Tech Note 105-073), 20 Jan. 1981.

If the range resolution of the radar is low, the radar might still have a measurement capability in range. In order to simulate range glint one can use two taps of a tapped delay line, and apply the modulation signals to each of the two taps. The tap spacing is somewhat arbitrary, but the best choice would be comparable to the target size.

MEASUREMENT OF ASPECT ANGLE

In order to implement the procedures previously discussed, it is necessary to know the aspect angle of the radar relative to the simulation platform, or the direction of the incoming wavefront. This information will be used to compute range to each scatterer for use in (3) through (5), the polar coordinate parameters ($d_n$, $\theta_n$) of the antennas relative to the radar line-of-sight, and subsequently the parameters in (17) and (18). Moreover, in order to simulate realistic target signatures, the aspect angle is needed to access the proper information in the target data base. Some type of measurement will have to be performed to obtain the aspect angle, and it would be preferable to base the measurement on the radar signal itself. It is not necessary, however, to measure the aspect angle with high accuracy if the procedures for compensating for platform motion are implemented to electrically stabilize the simulation platform.

It would be theoretically possible to use the signals received by the simulation antennas to perform this measurement, but the wide spacing of these antennas makes such a measurement difficult because:

1. there will be many grating lobes that might result in ambiguous solutions;
2. the relative phases at the antennas must be measured with high accuracy; and
3. platform vibrations and other error sources could seriously degrade the performance.

Because of these problems it would be preferable to use a separate antenna system to perform the measurement.

The best measurement system would provide simultaneous, near spherical coverage, which rules out a directive beam that scans. One configuration that offers such coverage is a set of crossed dipoles. In order to obtain a measurement accuracy of a few degrees, which would be sufficient to utilize a target-scattering model that varied as a function of the target aspect angle, the maximum separation of antenna elements need be only a few wavelengths.

Figure 3:
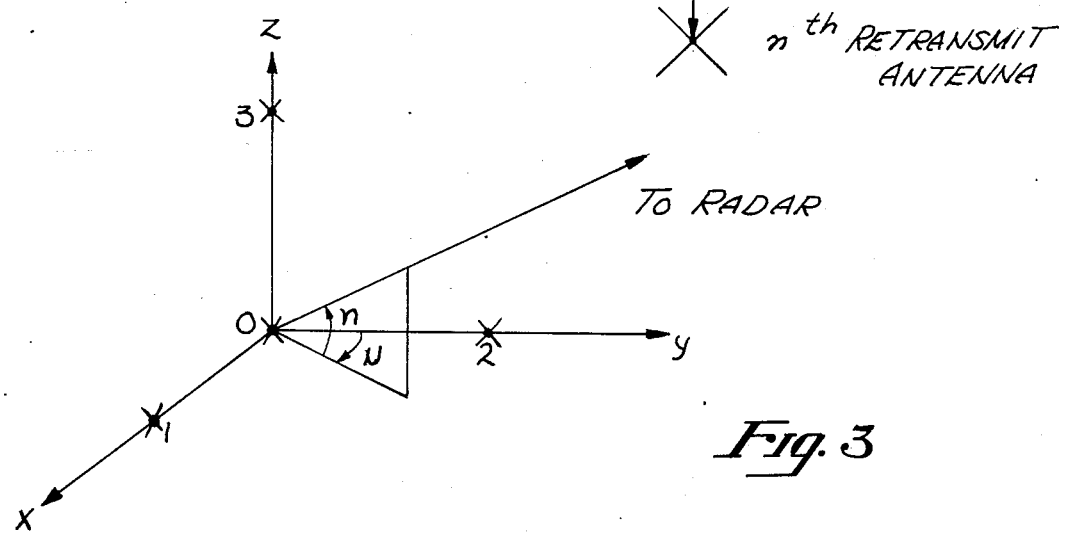
FIG. 3 is an illustration of the measurement antenna geometry

The arrangement of the four elements of FIG. 3 is entirely satisfactory to make this measurement. The differential phase between pairs of elements is given by $$\Delta\phi_{01} = 2\pi(r_o - r_1)/\lambda = 2\pi(l/\lambda) \sin \mu \cos \eta \quad (54)$$

$$\Delta\phi_{02} = 2\pi(r_o - r_2)/\lambda = 2\pi(l/\lambda) \cos \mu \cos \eta \quad (55)$$

$$\Delta\phi_{03} = 2\pi(r_o - r_3)/\lambda = 2\pi(l/\lambda) \sin \eta \quad (56)$$

where $r_k$ is the range to the $k^{th}$ dipole, l is the spacing of dipoles on the principal axes, $\mu$ is azimuth measured from the y-axis, and $\eta$ is elevation measured from the (x,y)-plane. Other dipole arrangements could also be used to make the measurement, such as a tetrahedron, but the solution for that in FIG. 3 is simplest.

Measurements will be made of the differential phase, $\Delta\hat\phi_{ij}$, between pairs of dipoles. The result will be a modulo $-2\pi$ operation of (54) through (56) plus noise. First we will compute a set of $\{\eta_m\}$ as $$\eta_m = \sin^{-1}\{(\lambda/l)[\Delta\hat\phi_{03}/2\pi + m]\} \quad (57)$$

where m is indexed over the set of integers such that the magnitude of the quantity within the braces in (57) does not exceed unity. Next compute a set of $\{\mu_{mn}\}$ as $$\mu_{mn} = \cos^{-1}\{(\lambda/l)[\Delta\hat\phi_{02}/2\pi + n]/\cos \eta_m\} \quad (58)$$

where n is indexed in a similar manner. Finally, search over all combinations of m and n to find the one that minimizes the difference between $\Delta\phi_{01}$ and $$[2\pi(l/\lambda) \sin \mu_{mn} \cos \eta_m] \text{modulo } 2\pi \quad (59)$$

The resulting pair of indices will designate the proper aspect angle ($\mu_{mn}$, $\eta_m$). The number of searches that must be implemented will be about $4(l/\lambda)^2$. Thus if $l/\lambda = 5$ there will be about 100 searches.

DETECTION PERFORMANCE OF MEASUREMENT SYSTEM

The power received by the radar from a point target is given by the radar range equation $$P_R = \frac{P_T G_R^2 \lambda^2 \sigma}{(4\pi)^3 r^4} \quad (60)$$

where $P_T$ is the peak transmit power, $G_R$ is the one-way power gain of the radar antenna, $\lambda$ is the wavelength, $\sigma$ is the radar cross section (RCS) of the target (power reflected in the direction of the radar per unit incident power density), and r is the target range. The power received by the intercept antenna on the simulation platform is given by $$P_I = \frac{P_T G_R A_I}{4\pi r^2} \quad (61)$$

where $A_I$ is the effective area of the antenna. The ratio of (61) and (60) is $$\frac{P_I}{P_R} = \frac{4\pi r^2}{\sigma} \frac{G_I}{G_R} \quad (62)$$

where $G_I = 4\pi A_I/\lambda^2$ is the gain of the intercept antenna in the direction of the radar. Also write $$\frac{P_I}{P_R} = \frac{r^2 \lambda^2}{\sigma} \frac{G_I}{A_R} \quad (63)$$

where $A_R = \lambda^2 G_R/4\pi$ is the aperture area of the radar antenna. Now assume that $G_I = 1$. Solving for range, a lower bound for a minimum ratio of $P_I/P_R$ is found as $$r \gtrsim \sqrt{(P_I/P_R)\sigma} \ (D/\lambda) \quad (64)$$

where $D = \sqrt{A_R}$ is the effective aperture width.

In order to evaluate the detection performance of the measurement system on the intercept platform, make the following assumptions:

1. the intercept receiver needs a 20 dB stronger signal than the radar in order to achieve the same performance (for example, the radar might employ coherent integration, but not the intercept receiver);
2. the target RCS is 10 m$^2$; and 3. the radar antenna width is 10 wavelengths.

With these assumptions we obtain the result that the intercept receiver will perform better than the radar whenever $r \gtrsim 300$ m. If $D/\lambda = 50$, as is common for ground-based radars, then $r \gtrsim 1.5$ km. These limits are also consistent with the minimum range at which the simulation platform will be wholly within the linear region of the radar antenna.

EXTENSIONS OF THE TECHNIQUE

The simulation techniques derived so far are based on a modulation and retransmission of the radar signal that is intercepted by the simulation system. There are two basic limitations to these techniques. First, the radar waveform must be pulsed because it will not be possible to receive and retransmit simultaneously. There must be some delay within the simulation system so that the complete radar pulse is received prior to retransmission. As a consequence the simulated target will appear delayed from the return of the simulation platform, a fact that could limit the utility of the simulation technique if the radar cross section of the platform is large. The second limitation is that the radar transmitter and receiver must be nearly collocated. Only with this monostatic geometry will it be possible to compensate for the platform motion with the automatic procedures hereinbefore described. Hereafter the simulation techniques will be extended to overcome these limitations.

SIMULATING CONTINUOUS WAVE SYSTEMS

Instead of modulating the radar signal that has been intercepted by the simulation system, it would be possible to generate the entire signal within the simulation system. Such a procedure could be implemented in a test environment, for example, where information on the radar signal might be provided to the simulation system via telemetry. However, it would be preferable to have a procedure that did not require a communication link with the outside world.

One need not transmit continuously from the simulation system, even if the radar were using a true cw signal. It would be possible to periodically intercept the radar signal and process it in the simulation system to determine the necessary parameters. Relatively little information would be needed in a cooperative experiment, but considerably more might be required in other applications. First, the direction of the radar is inspected in order to compensate for the phase on each antenna as previously discussed. But equally important, the phase or frequency modulation of the radar signal is needed. Otherwise, the radar receiver will not correctly process the simulated signal. Since the simulation system is working on the one-way path and the radar on the two-way path, it will only be necessary to intercept the radar signal about 1% of the time; the remaining 99% can be used to generate and transmit the simulated signal (this duty cycle is consistent with the previous example). With such a low duty cycle the radar will be unable to sense the fact that the simulated signal is not continuous.

SIMULATING BISTATIC SYSTEMS

In some cases the radar receiver is not collocated with the transmitter. This configuration is designated as a bistatic radar. It will be possible to do only a limited target signal simulation if the direction of the radar receiver is unknown to the simulation system. Basically one will only be able to have a target model with isotropic scattering centers, and the simulated target will appear to have the dynamics of the simulation platform.

In order to simulate a more realistic target one must know the direction of the receiver. This information could be supplied via telemetry from other sensors, but the simplest procedure would be to instrument the receiver platform with a beacon. The beacon signal should be out of the radar signal band to avoid interference. The measurement system discussed next could be used to compensate the phase on each antenna in the simulation system.

ANTENNA PHASE COMPENSATION

In order to compensate for the motion of the simulation platform it will be necessary to measure the phase of the signal at each antenna that arrives from the direction of the receiver. One antenna can be used as a reference, and the remaining antennas will be compensated to have the same phase relationship with respect to the radar receiver.

ADJUSTING DELAY

With a pulsed radar it might be desirable to delay the simulated target signal until just prior to the transmission of the next pulse so that the simulated target will appear to be in front of the return from the simulation platform. This will require a variable delay, in general, because the pulse repetition frequency may not be constant in the radar system. One method of implementing the variable delay is to switch, in real-time, various combinations of fixed delays. An alternate procedure would be to generate the entire simulation signal within the simulation system. Timing and phase information must be obtained from measurements on the intercepted radar signal.

IMPLEMENTATION

In order to simulate glint in two angular dimensions, at least three simulation antennas will be required as was previously shown. As the simulation platform rotates with respect to the radar the three antennas may eventually lie within a plane that also contains the radar. The glint simulation capability will be reduced to a line unless a fourth antenna is added to the system in a tetrahedron configuration. Four antennas is thus the absolute minimum if spherical coverage is required. At any given aspect only three of the four are required. In practice some of the antennas will be required to ensure that at least three will always be visible to the radar.

Figure 4:
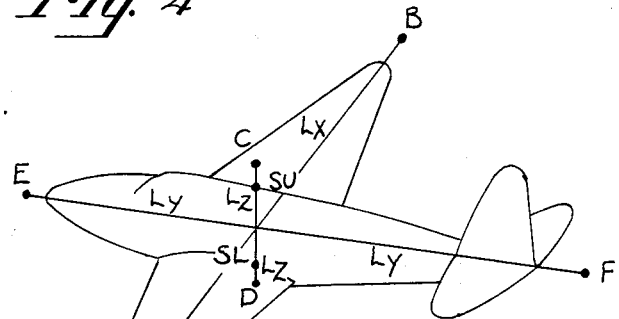
FIG. 4 is a schematic illustration of the placement of six antennas on a simulation platform

There is a considerable advantage to the use of four antennas in the configuration to automatically compensate the motion of the platform. However, to ensure that four will always be visible to the radar regardless of the platform orientation, we will need six in the configuration as shown in FIG. 4. Four at a time can be switched in according to the encounter geometry, the choice being dependent also on shadowing considerations. Thus there is one more requirement for the measurement of the aspect angle. In the following discussion certain results will be derived on the basis of the configuration in FIG. 4. The technique is not limited to this configuration, however; similar results can be easily derived for any configuration of antennas.

COORDINATE TRANSFORMATIONS

Figure 5:
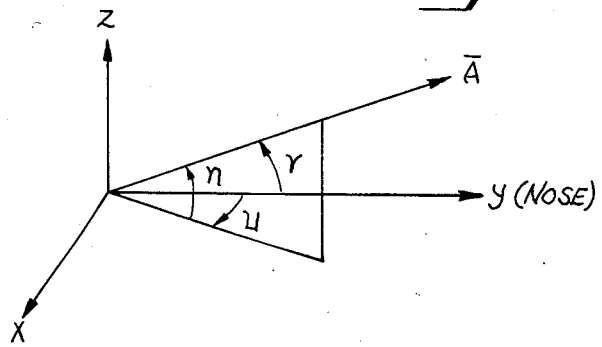
FIG. 5 is an illustration of the target coordinate geometry

The scattering centers that form the target model will be expressed in target coordinates. In order to compute the modulation signals the coordinates must be transformed to some system relative to the radar. Let us define the (x,y,z) target coordinate system to be aligned with the right wing, nose, and zenith, respectively. Let us also define a vector $\overline{A}$ that points from the target center of rotation to the radar. The pair of angles $(\mu,\eta)$ will uniquely define the direction of $\overline{A}$ as shown in FIG. 5. In addition, define a vector $\overline{B}$ that is perpendicular to $\overline{A}$ and lies within the plane containing $\overline{A}$ and the y-axis. A third vector, $\overline{C}$, will complete the orthogonal coordinate system.

In order to simply the subsequent computations, define $\gamma$ to be the angle between the vector $\overline{A}$ and the y-axis. Then $$\cos \gamma = \cos \mu \cos \eta \tag{65}$$

The vectors $\overline{A}$, $\overline{B}$, and $\overline{C}$ will have the following direction cosines in the target coordinate systems $$a_x = \sin \mu \cos \eta \tag{66}$$

$$a_y = \cos \gamma \tag{67}$$

$$a_z = \sin \eta \tag{68}$$

$$b_x = -\sin \mu \cos \eta / \tan \gamma \tag{69}$$

$$b_y = \sin \gamma \tag{70}$$

$$b_z = \sin \eta / \tan \gamma \tag{71}$$

$$c_x = -\sin \eta / \sin \gamma \tag{72}$$

$$c_y = 0 \tag{73}$$

$$c_z = \sin \mu \cos \eta / \sin \gamma \tag{74}$$

Thus any coordinate (X,Y,Z) in the target coordinate system will have a coordinate (A,B,C) in the transformed system, where $$\begin{Bmatrix} A \\ B \\ C \end{Bmatrix} = \begin{bmatrix} a_x\, a_y\, a_z \\ b_x\, b_y\, b_z \\ c_x\, c_y\, c_z \end{bmatrix} \begin{Bmatrix} X \\ Y \\ Z \end{Bmatrix} \tag{75}$$

The choice of coordinates has a singularity whenever $\mu = \eta = 0$. An alternate choice for the B and C vector components, which shifts this singularity to the x-axis, to have $\overline{B}$ perpendicular to $\overline{A}$ and lie within the plane containing $\overline{A}$ and the negative x-axis. In this case define $$\mu' = \mu + \pi/2 \tag{76}$$

to be the azimuth measured from the negative x-axis, and $$\cos \gamma' = \cos \mu' \cos \eta \tag{77}$$

where $\gamma'$ is the angle of $\overline{A}$ measured from the negative x-axis. We now obtain the following direction cosines:

$$a_x = -\cos \gamma' \tag{78}$$

$$a_y = \sin \mu' \cos \eta \tag{79}$$

$$a_z = \sin \eta \tag{80}$$

$$b_x = -\sin \gamma' \tag{81}$$

$$b_y = -\sin \mu' \cos \eta / \tan \gamma' \tag{82}$$

$$b_z = -\sin \eta / \tan \gamma' \tag{83}$$

$$c_x = 0 \tag{84}$$

$$c_y = -\sin \eta / \sin \gamma' \tag{85}$$

$$c_z = \sin \mu' \cos \eta / \sin \gamma' \tag{86}$$

Note that $\overline{A}$ is the direction of negative range, so that range, referenced to the target center of rotation, is given by $$r = -A \tag{87}$$

The azimuth and elevation $(\alpha,\epsilon)$ can be defined in linear units as $$\alpha = B \tag{88}$$

$$\epsilon = C \tag{89}$$

The resulting values for r, $\alpha$, and $\epsilon$ for each scattering center in the target data base can now be used in (3) through (5), along with the amplitude A, to compute the scintillation and glint signals.

The aspect angle $(\mu,\eta)$ used in the above calculations could be that of the simulation platform. However, it need not be. Usually the simulated target orientation will be roughly the same as that of the platform so that the orientation is consistent with the platform flight path. But it is possible to simulate any target orientation independent of the platform. Moreover, it is possible to simulate any target dynamics, as will be now illustrated.

SIMULATION OF TARGET DYNAMICS

The compensation techniques described in earlier sections will stabilize the rotational motion components of the simulation platform as they appear to the radar. If the modulation signals that are applied to the antennas are stationary (not time varying) the simulated target will also appear to be stabilized in the rotational motion components, which is not representative of realistic targets, in general. One can, however, induce appearent rotational motions in the simulated target signal by making the modulation signals dynamic. The simulated target can be made to perform a complicated set of maneuvers in the general vicinity of the simulation platform, maneuvers that would be entirely independent of the motion of the simulation platform.

First define $\Omega_x$, $\Omega_y$, and $\Omega_z$, to be small angular rotations of the x, y, and z axes, respectively, corresponding to pitch, roll, and yaw. The sense will be positive clockwise looking out the axes. The displacements of a coordinate (X,Y,Z) will be $$\Delta X = Z\Omega_y - Y\Omega_z \tag{90}$$

$$\Delta Y = X\Omega_z - Z\Omega_x \tag{91}$$

$$\Delta Z = Y\Omega_x - X\Omega_y \tag{92}$$

Now use (75) to compute $\Delta A$, $\Delta B$, and $\Delta C$. In general, $\Omega_x$, $\Omega_y$, and $\Omega_z$ will be functions of time as defined by the target model dynamics.

COMPUTATION OF MODULATION SIGNALS

Given the scintillation and glint signals in (3) through (5) one can use (50) through (53) to compute the modulation signals $\{U_n\}$ applied to the four antennas. In high resolution applications the signals will be a function of range as $\{U_n(i)\}$ that are applied to the various taps of the tapped delay line. In order to solve the equations in (50) through (53) one needs the projected distances $d_1$ and $d_3$, and the angle $\psi$ as shown in FIG. 1.

First find the A, B, C coordinates of each antenna. Let $L_x$, $L_y$, and $L_z$ be the distance of the antennas on the x-, y-, and z-axes, respectively, from the target center of rotation as is shown in FIG. 4. Define $A_x$ to be the A-coordinate of the antenna on the x-axis, $B_x$ the B-coordinate, and so on. The general solution is $$\begin{bmatrix} A_x & A_y & A_z \\ B_x & B_y & B_z \\ C_x & C_y & C_z \end{bmatrix} = \begin{bmatrix} a_x & a_y & a_z \\ b_x & b_y & b_z \\ c_x & c_y & c_z \end{bmatrix} \begin{bmatrix} L_x & 0 & 0 \\ 0 & L_y & 0 \\ 0 & 0 & L_z \end{bmatrix} \quad (93)$$

The particular choice for the coefficients, either (66) through (74) or (78) through (86), depends on which four antennas are being used. If two of the antennas are on the y-axis one will place the singularity on the y-axis and use (66) through (74). Thus the projected distance of the antennas on the y-axis is $$d_1 = |B_y| = L_y |\sin \gamma| \quad (94)$$

If the second set of antennas is on the x-axis we obtain $$\tan \psi = C_x/B_x = \tan \eta / \sin \mu \cos \gamma \quad (95)$$

and $$d_3 \sin \psi = |C_x| = L_x |\sin \eta / \sin \gamma| \quad (96)$$

If the second set of antennas is on the z-axis, instead of the x-axis, one obtains $$\tan \psi = C_z/B_z = \sin \mu / \cos \gamma \tan \eta \quad (97)$$

and $$d_3 \sin \psi = |C_z| = L_z |\sin \mu \cos \eta / \sin \gamma| \quad (98)$$

If the radar views the target from near nose-on or tail-on, the projected separation of the antennas on the y-axis will be small. In such cases it would be preferable to use the other four antennas. One now uses (78) through (86), so that $$d_1 = |B_x| = L_x \sin \gamma', \quad (99)$$

$$\tan \psi = C_z/B_z = -\sin \mu'/\cos \gamma' \tan \eta, \quad (100)$$

and $$d_3 \sin \psi = |C_z| = L_z |\sin \mu' \cos \eta / \sin \gamma'|. \quad (101)$$

One now has all of the information to be used in (50) through (53) to compute the modulation signals $\{U_n(i)\}$.

ANTENNA SEPARATION

The simulation techniques described here can be applied to any target model. It will be possible to simulate a target much larger in extent than the simulation platform, which dictates the maximum antenna spacing. Signals can be made to appear to originate from points in space that lie outside of the volume defined by the simulation antennas. In theory, any antenna spacing could be used; however, in practice small errors in the signal generation process will get magnified by the ratio of the sizes of the simulated target and the platform. The use of a large antenna separation is therefore preferable.

COMPUTATION UPDATE RATES

The modulation signals in (50) through (53) will have a bandwidth that can be as high as 1 kHz, depending on the target size, wavelength, platform motion, and the radar range resolution. This means that the update cycle for the computation might have to be as small as 1 msec. Many computations will have to be performed in this time as summarized below:

Rapid update for each scatterer (~1 msec)

1. displacements due to target motion in (90) through (92);
2. coordinate transform in (75);
3. range, azimuth, and elevation increments;
4. phasor summations in (3) through (5); and
5. modulation signals in (50) through (53).

Slower update for target cg (~10 msec)

1. computations for aspect angle $(\mu, \eta)$ in (54) through (59);
2. determine which pairs of antennas to use; and
3. antenna projection coefficients in (94) through (101).

The computations must be performed by a high-speed digital computer, probably with a parallel or array processor architecture, in order to achieve these update rates.

TARGET MODEL DATA BASE

At a given target aspect the target model will specify four parameters for each scattering center: amplitude and three coordinates $(A_k, X_k, Y_k, Z_k)$. As the target rotates with respect to the radar some scattering centers will disappear because of shadowing, others will appear, and all will change slighty in terms of the above four parameters.

In the implementation of the model it would be desirable to assume that the four parameters remain constant throughout some angular sector. Linear interpolation would permit a coarser sampling of the target model, but it would require more computation. More importantly, the sudden appearance and disappearance of scattering centers as the target rotates is difficult to implement with linear interpolation. However, without interpolation the size of the data base will be large.

As an example, sample the target model every 3° in both azimuth and elevation, and let the target be left-right symmetrical. One will need 61 samples in both azimuth and elevation, or 3721 aspect samples in total. For each aspect sample one will have four parameters for each scatterer. Assuming a target model with 10 scatterers, then one will have $4 \times 10 \times 3721 = 148,840$ words in the data base. A sampling of 2° would require over 330,000 words, and a sampling of 1° would require over 1.3 million words.

If the target aspect will be generally known in the engagement with the radar, the relevant parameters can be sorted beforehand in the order that they will be used. However, in a noncooperative engagement, or whenever both the radar and simulation platform are moving, one must be able to access the entire data base (or at least most of it) rapidly. Thus some type of "core" storage must be used.

IMPLEMENTATION OF SIGNAL MODULATION

Figure 6:
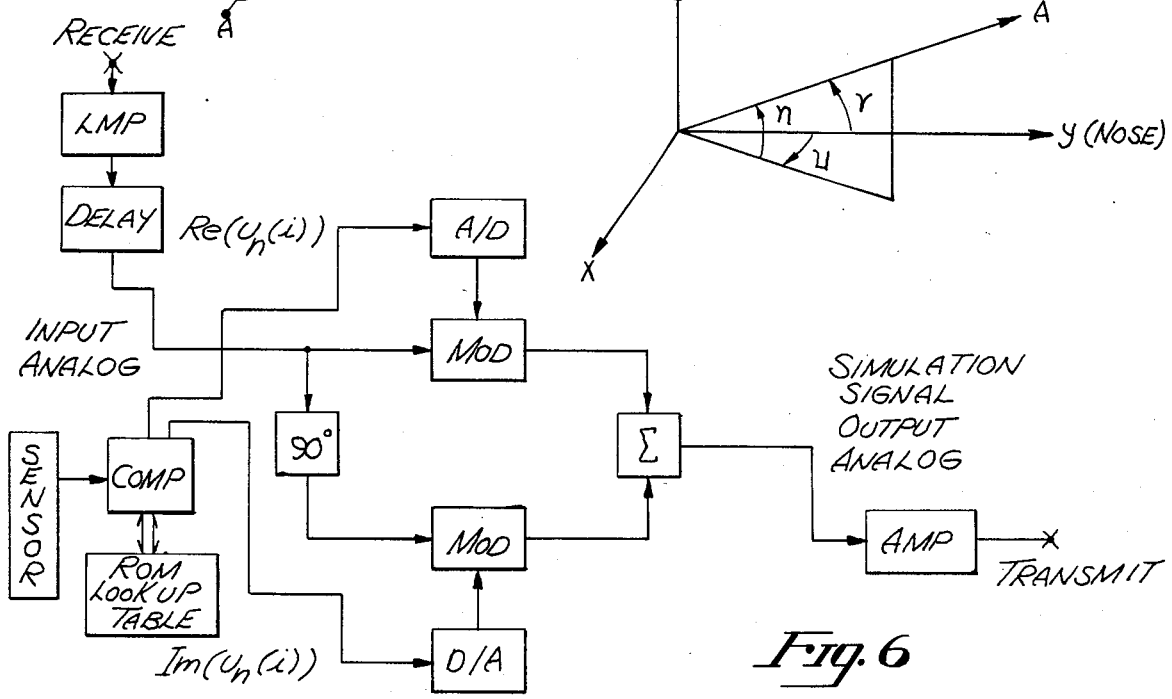
FIG. 6 is a block diagram illustrating the digital modulation of the analog signal applied to the i th tap of the tapped delay line on the n th antenna

The modulation signals $\{U_n(i)\}$ that are applied to each tap of the tapped delay line on each simulation antenna will be generated in a digital format. They must be converted to analog prior to the application to the modulators. The signals are complex, containing both amplitude and phase information. The modulation can be applied on the two channels of in-phase and quadrature, or on amplitude and phase. The former requires no transformation and results in a cleaner simulated spectrum, but either method should be acceptable for target signature augmentation. FIG. 6 illustrates how the quadrature modulation signals (the real and imaginary parts of the complex modulation signal $U_n(i)$) can be applied to the output of each tap of the tapped delay line. The actual modulation can be done at rf, as is implied with the scheme in FIG. 2, or it can be applied at some intermediate frequency. In the latter case the operations of mixing down and mixing up must be added to FIG. 2.

POWER SCALING

When the radar signal is intercepted and retransmitted by the simulation system it must be amplified to simulate the desired target radar cross section. Let $\sigma$ designate the radar cross section of a point scatterer; it is the ratio of power reflected in the direction of the radar receiver to the incident power density. Let $G_S$ be the gain of the simulation system; it is the ratio of power retransmitted to the power intercepted. Let the gain of the simulation antennas be unity, so that the effective "aperture" area is $A_e = \lambda^2/4\pi$. Using the above definitions of $\sigma$ and $G_S$, one can write $$G_S = \sigma/A_e = 4\pi\sigma/\lambda^2. \tag{102}$$

As an example, let $\sigma = 1$ m² and $\lambda = 0.03$ m (X-band). It follows that the gain of the amplifier must be $G_S = 41$ dB.

In practice the gain of the simulation antennas will not be precisely unity and there will be losses due to depolarization, rf plumbing, and processing. The known losses must be compensated for by additional amplification; the unknown or unpredictable losses will result in some error. Usually this error will be insignificant to the radar.

The modulation signals $\{U_n(i)\}$ in digital format must be D/A converted prior to the application to the modulators on the tapped delay line. One can search for the one with maximum power as $$\sigma = \max_{n,i} \{|U_n(i)|^2\}, \tag{103}$$

and then rescale all signals by $1/\sqrt{\sigma}$. The simulation system will be calibrated so that a unit-amplitude digital modulation signal will utilize the full range of the A/D converter. The required processor gain is then given by (102).

MINIMUM RANGE LIMITATION

Throughout this disclosure, it has been assumed that the radar is far enough away from the simulation platform so that the platform will be within the linear region of the monopulse antenna (or whatever antenna system is used to measure angle). In other words, the simulated signals received by the radar will result in measurements that are independent of the direction of the radar antenna boresight axis. If the range is so short that this assumption is no longer valid, then the techniques heretofore described will not be valid either. An entirely different technique can be derived for this short-range situation that would require information on the radar antenna (direction of boresight axis and 2-dimensional patterns). However, the technique is probably now impractical outside of a well-instrumented laboratory.

The technique described herein will begin to break down when the apparent separation of antennas on the simulation platform is about one beamwidth of the radar antenna. If W is the largest dimension of the simulation platform, then one must require that $$W \lesssim r\lambda/D, \tag{104}$$

where r is the range, $\lambda$ is the wavelength, and D is the aperture width of the radar antenna. The minimum range is thus $$r \gtrsim W(D/\lambda). \tag{105}$$

Equation (64) provides a limit on range on the basis of intercept receiver performance, which is repeated here as $$r \gtrsim \sqrt{(P_I/P_R)\sigma} \; (D/\lambda). \tag{106}$$

In general W will be smaller than $\sqrt{(P_I/P_R)\sigma}$, so that (106) will result in a larger lower bound on r.

Figure 7:
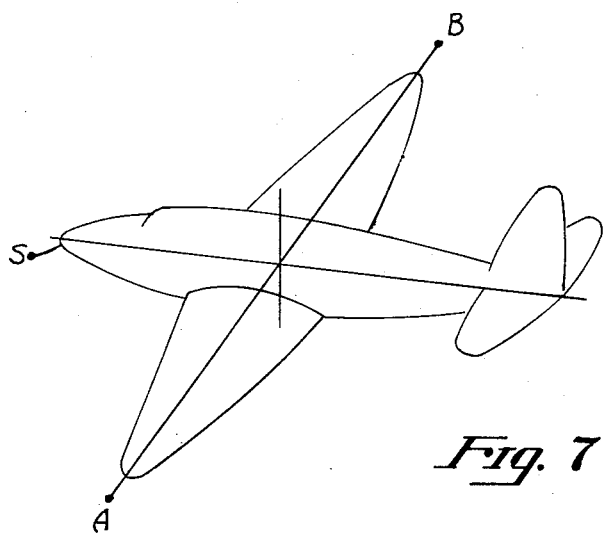
FIG. 7 is a schematic illustration of the placement of one antenna pair and a sensor on a simulation platform

In partial summary of the foregoing, the advantages and limitations of various embodiments of the present invention may be seen. In particular, a minimum system in accordance with the present invention comprises a two antenna scheme such as illustrated in FIG. 7. The antennas A,B are mounted on the moving simulation platform with some substantial separation, and with an orientation so as to not be collinear with the radar set to which the simulated target signals are to be directed. Since normally the simulation platform is generally approaching the radar set, the antennas A,B might be conveniently placed at the wing tips of the airframe. This provides the desired separation of the antennas, as well as locates the mid-point therebetween at the approximate center of gravity of the air frame. The placement of the antenna pair so that the mid-point therebetween is approximately at the airframe center of gravity has the advantage that the dynamics of the simulation platform are automatically compensated for in accordance with the preferred method of the present invention, so that compensation of the simulation signals transmitted by the antennas A,B for the roll, pitch and/or yaw of the airframe is not required.

In accordance with this preferred method, signals from the remote radar set are received by antennas A and B. These signals will be received at slightly differing times because of the slightly differing ranges of each of the antennas A,B as measured from the remote radar set. This difference in range, while small in comparison to the distance of the radar set, in general will be large with respect to the wave length of the radar signal so as to have a substantial effect on the phasor interference of the simulation signals to be subsequently transmitted by the antennas A,B. In accordance with the method, however, the signals received on each of antennas A and B are each given the same predetermined delay and then retransmitted from the opposite antenna from which each was received. In this manner, the difference in range of the two antennas A and B is compensated for, so that no differential delay or phase compensation in the signals transmitted by the antennas A,B is required. Each signal will be received with the proper phase by the radar, regardless of the orientation of the simulation platform.

The signals transmitted from the antennas A,B (referring still to FIG. 7) will generally be signals simulating some target other than the simulation platform, as referred to in the claims as the simulated target. In general, the simulated target will have its own glint and scintillation characteristics, which may be predetermined by known or measured characteristics of the target to be simulated. These characteristics will be stored in read only memory in digital form for subsequent conversion to an analog signal for modulation of the received radar signals prior to retransmission as the simulated signals. In particular, refer to FIG. 6 where the simulated target characteristics are represented by the digital modulation signals $U_n$ (i), corresponding to the ith tap of the tapped delay line (only one or two taps will be needed if the radar resolution is low) and the nth antenna (either A or B in this embodiment). The apparatus for reception on one antenna and retransmission on another may be envisioned.

Thus, in this simplest form of the invention, the moving platform or simulation platform may be given the characteristics, as viewed by the distant radar, of some entirely different target. In the case of pulsed radar, the fixed delay may be chosen to be relatively short so that the simulation signals may be transmitted shortly after the radar pulse has been received by both antennas A and B. In this case the simulated target will appear to be somewhat behind the simulation platform. On the other hand, the delay could be increased to the point that the transmission of the simulation signals occurs just before the receipt of the next radar pulse that was reflected from the platform, in which case the apparent range of the simulated target will be less than that of the simulation platform.

The target being simulated should have glint and scintillation characteristics that will vary with its orientation with respect to a remote radar set, just as an actual target would behave. Since the flight path of the simulated target will be the same as the flight path of the simulation platform, the fact that the simulated target was not the real target could readily be detected by noting a change in course without substantial changes in the glint and scintillation characteristics thereof. In many instances, however, the position of the remote radar may be known and the flight path of the simulation platform may be predetermined, in which case the orientation of the remote radar with respect to the simulation platform as a function of time will be known. Consequently, the signals applied as the real and imaginary modulating signals of the circuit of FIG. 6 may be made to vary with time in relation to the predetermined flight path and known position of the remote radar set, so that the simulation signals being transmitted on antennas A,B more appropriately simulate the scintillation and glint of the desired target making a maneuver corresponding to the maneuver of the simulation platform. In other instances, one can place a sensor on the simulation platform, such as the sensor S shown in FIG. 7, to sense the direction of the received radar signal. The glint and scintillation characteristics of the simulated target can now be compiled to correspond to the same flight path as the simulation platform. The sensor itself may be an orthogonal array of isotropic antenna elements or dipoles as indicated in FIG. 3, preferably of a size no more than a few wavelengths of the radar signal to avoid ambiguity in the angle measurement.

The above configuration applies to radars having all types of range resolution. If the radar has no range resolution, then only fixed delay between reception and retransmission is unimportant. If the radar has low resolution in range, then two taps of a tapped delay line are required to simulate a signal that glints in range anywhere between the two taps. Even for higher resolution use, the configuration of two antennas A,B is still valid. In particular, some radars have a range sensitivity which allows the detection of the depth of the target. The simulation platform may also simulate depth by transmitting the received signals after an appropriate delay and modulation (amplitude and phase), and by subsequently transmitting one or more somewhat further delayed signals appropriately processed in a similar manner. This tapped delay line configuration is described with respect to FIG. 2, and allows a simple two antenna system on the simulation platform to simulate the range extent as well as the glint (in one angular dimension) and scintillation of the desired simulated target. Obviously, as before, where the position of the radar and the flight path of the simulation platform are known, the system may be programmed so that the simulation remains relatively accurate throughout the flight path of the simulation platform. On the other hand, a sensing system may be used so that the output of each tap of the tapped delay line (FIG. 2) may be modulated in accordance with the proper signal compiled from the relative angle between the radar and the simulation platform. The simulation will automatically remain consistent throughout any reasonable simulation platform flight path. In this regard, while the range extent of the various scatterers on the simulated target will vary the time of flight in the path, this effect may be simulated with the use of fixed taps on the delay line if the taps have a separation roughly equal to the range extent sensitivity of the radar (the range gate spacing) or less, by appropriate modulation of each signal on each tap so that the simulated scatterers appear to vary in range with flight path as described. In general then, each tap of the tapped delay line would be modulated in a manner similar to that shown in FIG. 6, i.e., by a real and an imaginary part of the simulation signal (or the amplitude and phase) under command as required for the appropriate simulation.

The two antenna system does have certain limitations which may be overcome by the use of additional antennas. Two antennas can only simulate angular glint along the line that passes through the antennas. In addition, it was previously pointed out that the two antennas should not be collinear with the radar set, as antennas A,B in FIG. 7 would be if the simulation platform were viewed by radar from the side. Even before one approaches such collinearity, one of the antennas may be shaded by the structure of the simulation platform itself so as to essentially eliminate its effectiveness as a receiving antenna or as a simulation signal radiating antenna. To alleviate this problem, three antennas could be used, such as antennas A,B and E of FIG. 4. With a sensor S, the direction of the incoming radar wave may be sensed, and the best two antennas to use for the simulation antennas could be selected, i.e., A,B or A,E or E,B, depending upon the direction of the incoming radar signal. Obviously, the combinations A,E and E,B have the disadvantage of a shorter baseline, which makes the simulation of angular glint less precise. In addition, the midpoint therebetween will be substantially off the center of gravity of the simulation platform, so that simulation platform dynamics will appear in the simulation signals as transmitted unless compensated for. Alternatively, all three antennas A, E, and B could be used as previously described, which will generally provide a two dimensional simulation in angle without tapped delay lines, or a three dimensional simulation if tapped delay lines are used, at least for simulation platform-radar set orientations wherein no antenna is shaded and no two antennas are collinear with the radar set. Phase compensation based upon the direction of the incoming signal would be required if all three antennas are on simultaneously, because of the lack of the compensating effect that is achieved in a two-antenna system by reception on one antenna and transmission on the other.

It is to be understood that the antennas in the systems disclosed herein, such as antenna A, may represent the combination of a reception antenna and a separate transmitting antenna, in order to achieve electrical isolations, so long as the placement and operation of the reception antennas meet the requirements for receiving the radar signals from the radar set as set forth herein and in the claims, and similarly, the transmitting antennas meet the requirements for transmission of the simulation signals as set forth herein and in the claims.

As hereinabove explained, the two antenna system can simulate a two dimensional target, the first dimension being generally in the direction of the projection of the line connecting antennas A,B (or whatever other antennas are used) into a plane perpendicular to a line from the radar set to the simulation platform, and the second dimension being in range extent as simulated through the use of the tapped delay line. A second dimension in angle can be simulated without the use of a tapped delay line through the use of a second non-collinear antenna pair, such as antenna pair C,D as shown in FIG. 4. Essentially each antenna pair will operate as hereinbefore described for antenna pair A,B. Assuming that the midpoints between A,B and C,D are coincident, each antenna pair may operate independently, provided they operate on the same time delay. Obviously, by use of tapped delay lines for each antenna pair, the third dimension of range may be simulated.

Finally, other configurations of greater numbers of antennas may also be used for various purposes. In particular, it will be noted that FIG. 4 also illustrates an additional antenna pair E,F with upper and lower sensing antennas SU and SL, respectively. Thus, there are three antenna pairs orthogonally located on the simulation platform of FIG. 4. The net result of such a configuration is that at least two antenna pairs will be unshaded at all times regardless of the direction of the incoming radar signal. Accordingly, by selection of the appropriate sensing antennas as well as the receiving and transmitting antennas, the simulation may be maintained for all flight path angles relative to the remote radar set.

There has been described herein various methods and apparatus for allowing a moving simulation platform to simulate an entirely different target, and various embodiments thereof have been described in detail herein.

From the illustrations and descriptions given, it will be understood to those skilled in the art that various changes in form and detail may be made therein without departing from the spirit and scope of the invention.

I claim:

1. A method of creating a realistic radar target signature on a moving airborne simulation platform as seen by a distant radar set by compensating for the motion of the airborne platform comprising the steps of
    (a) placing first and second radar antennas on the simulation platform so as to be substantially non-collinear with the radar set
    (b) receiving radar signals from the radar set on the first and second radar antennas on the simulation platform to provide the first and second received radar signals
    (c) amplifying said first and second received radar signals to provide a set of first and second amplified signals responsive to the first and second received signals, respectively
    (d) delaying said first and second amplified signals to provide the set of first and second delayed signals responsive to the first and second amplified signals, respectively, and
    (e) transmitting simulated target signals from the first and second antennas on the simulation platform which are responsive to each set of second and first delayed signals, respectively, whereby the signal intercepted by one antenna is retransmitted by the other, and vice versa, so that the total path lengths between the simulation platform and the distant radar set for the two signals will be identical, regardless of the relative geometry between the simulation platform and the distant radar set.

2. The method of claim 1 wherein the simulated target signals transmitted from the first and second antennas are each controlled to simulate the glint and scintillation characteristics of the simulated target.

3. The method of claim 1 wherein the first and second radar antennas placed on the simulation platform are placed so that the midpoint therebetween is approximately at the center of gravity of the simulation program in order to effect the compensation of the platform motion.

4. The method of claim 1 wherein step (d) comprises the step of delaying the first and second radar signals by a plurality of delay times to provide an equal plurality of sets of first and second delayed signals, each set being responsive to the first and second received signals, respectively, to simulate target range extent.

5. The method of claim 4 wherein the simulated target signals transmitted from the first and second antennas are each controlled to simulate glint and scintillation characteristic of the simulated target throughout the simulated range extent.

6. The method of claim 4 wherein the first and second radar antennas placed on the moving platform are placed so that the midpoint therebetween is approximately at the center of gravity of the moving platform in order to effect the compensation of the platform motion.

7. The method of claim 1 wherein the radar set is a pulsed radar set.

8. A method of simulating a creating a realistic radar target signature on a moving airborne simulation platform as seen by a distant radar set by compensating for the motion of the airborne platform comprising the steps of (a) placing three radar antennas on the moving simulation platform so as to be substantially noncollinear with each other (b) placing a sensing means on the moving simulation platform and detecting the direction of an incoming radar signal reviewed from the distant radar set (c) selecting two antennas from the three antennas on the moving simulation platform, designated as the first and second radar antennas responsive to the sensing means so that the two selected antennas are substantially noncollinear with the radar set (d) receiving radar signals from the radar set on the first and second radar antennas to provide first and second received radar signals (e) delaying the first and second received radar signals to provide at least one set of first and second delayed signals responsive to the first and second received signals, respectively and (f) transmitting simulated target signals from the first and second antennas on the moving platform which are responsive to each set of second and first delayed signals, respectively, whereby for the first and second antennas, the signal intercepted by one antenna is retransmitted by the other, and vice versa, so that the total path lengths between the simulation platform and the distant radar set for the two signals will be identical, regardless of the relative geometry between the simulation platform and the distant radar set.

9. The method of claim 8 wherein the simulated target signals transmitted from the first and second antennas are each controlled to simulate the glint and scintillation characteristics of the simulated target.

10. The method of claim 9 wherein the simulated target signals are controlled in a manner dependent upon the angle sensed by the sensing means, whereby the simulated target signals, will simulate the glint and scintillation characteristics of the simulated target in the same flight part as the simulation platform.

11. The method of claim 9 wherein step (e) comprises the step of delaying the first and second radar signals by a plurality of delay times to provide an equal plurality of sets of first and second delayed signals, each set being responsive to the first and second received signals, respectively, to simulate range extent.

12. The method of claim 11 wherein the simulated target signals transmitted from the first and second antennas are each controlled to simulate glint and scintillation characteristic of the simulated target throughout the simulated range extent of the target.

13. The method of claim 9 wherein the radar set is a pulsed radar set.

14. A method of creating a realistic radar target signature with angular glint in two dimensions on a moving airborne simulation platform as seen by a distant radar set by compensating for the motion of the airborne platform comprising the steps of (a) placing three radar antennas on the moving simulation platform so as to be substantially noncollinear with each other (b) placing a sensing means on the moving simulation platform and detecting the direction of an incoming radar signal received from the distant radar set (c) receiving radar signals from the radar set on the first, second and third radar antennas to provide first, second and third received radar signals (d) delaying the first, second and third received radar signals, each by a respective delay time dependent upon the angle sensed by the sensing means to provide at least one set of first, second and third delayed signals responsive to the first, second and third received signals respectively, and (e) transmitting simulated target signals from the first, second and third antennas on the moving platform, each responsive to one of the third, first and second delayed signals, respectively.

15. The method of claim 14 wherein the first delayed signal is transmitted on the second antenna, the second delayed signal is transmitted on the third antenna and the third delayed signal is transmitted on the first antenna, whereby the first, second and third delayed signals are transmitted on one of the three antennas other than the first, second and third antennas respectively.

16. A method of creating a realistic radar target signature on a moving airborne simulation platform as seen by a distant radar set by compensating for the motion of the airborne platform comprising the steps of (a) placing a plurality of pairs of radar antennas on the simulation platform, each pair having first and second radar antennas, each of the plurality of pairs of radar antennas being disposed so that each pair is substantially noncollinear with any other pair (b) placing at least one sensing means on the simulation platform and detecting the direction of an incoming radar signal received from the distant radar set (c) selecting, responsive to the sensing means, at least one of the plurality of pairs of the antenna, which selected at least one pair of antennas are not substantially collinear with the radar set, and (d) for each of the at least one selected pair (1) receiving radar signals from the radar set on the first and second radar antennas to provide first and second received radar signals (2) delaying the first and second received radar signals by at least one delay time to provide at least one set of first and second delayed signals responsive to the first and second received signals, respectively and (3) transmitting simulated target signals from the first and second antennas on the moving platform which are responsive to each corresponding set of second and first delayed signals, respectively, whereby for each selected pair, the signal intercepted by one antenna is retransmitted by the other, and vice versa, so that the total path lengths between the simulation platform and the distant radar set for the two signals will be identical, regardless of the relative geometry between the simulation platform and the distant radar set.

17. The method of claim 16 wherein the simulated target signals transmitted from the first and second antennas are each controlled to simulate the glint and scintillation characteristics of the simulated target.

18. The method of claim 17, wherein the simulated target signals transmitted from the first and second antennas are each controlled to simulate the glint and scintillation characteristics of the simulated target in at least two dimensions.

19. The method of claim 18 wherein sensing means is placed on the simulation platform to sense the angle between the platform coordinates and the radar signals being received, and wherein the amplitude and phase of the simulated target signals are controlled in a manner further dependent upon the angle sensed by the sensing means, whereby the simulated target signals will simulate the glint and scintillation characteristics of the simulated target in the same flight path as the simulation platform.

20. The method of claim 16 wherein the first and second radar antennas of each pair of radar antennas placed on the simulation platform are placed so that the midpoint therebetween is approximately at the center of gravity, or the center of stability, of the simulation platform in order to effect the compensation of the platform motions.

21. The method of claim 16 wherein the step of subparagraph (2) of step (d) comprises the step of delaying the first and second radar signals by a plurality of delay times to provide an equal plurality of sets of first and second delayed signals, each set being responsive to the first and second received signals, respectively to simulate range extent.

22. The method of claim 21 wherein the simulated target signals transmitted from the first and second antennas are each controlled to simulate glint and scintillation characteristic of the simulated target throughout the simulated range extent.

23. The method of claim 16 wherein the radar set is pulsed radar set.

24. A method of creating a realistic radar target signature on a moving airborne simulation platform as seen by a distant radar set by compensating for the motion of the airborne platform comprising the steps of
   (a) placing two pair of radar antennas on the moving simulation platform, each pair having first and second radar antennas, each pair of radar antennas being disposed so that each pair is substantially noncollinear with any other pair and with the distant radar set
   (b) for each of the pair of antennas
      (1) receiving radar signals from the radar set on the first and second radar antennas to provide first and second received radar signals
      (2) delaying the first and second received radar signals by at least one delay time to provide at least one set of first and second delayed signals responsive to the first and second received signals, respectively and
      (3) transmitting simulated target signals from the first and second antennas on the moving platform which are responsive to each set of second and first delayed signals, respectively, whereby for each pair of antennas, the signal intercepted by one antenna is retransmitted by the other, and vice versa, so that the total path lengths between the simulation platform and the distant radar set for the two signals will be identical, regardless of the relative geometry between the simulation platform and the distant radar set.

25. The method of claim 24 wherein the first and second radar antennas of each pair of radar antennas placed on the simulation platform are placed so that the midpoint therebetween is approximately at the center of gravity, or the center of stability of the simulation platform in order to effect the compensation of the platform motion.

26. The method of claim 24 wherein the step of subparagraph (2) of step (b) comprises the step of delaying the first and second radar signals by a plurality of delay times to provide an equal plurality of sets of first and second delayed signals, each set being responsive to the first and second received signals, respectively, to simulate a three dimensional target.

27. The method of claim 26 wherein the simulated target signals transmitted from the first and second antennas are each controlled to simulate glint and scintillation characteristic of the simulated target throughout the simulated range extent.

28. The method of claim 24 wherein the radar set is a pulsed radar set.

29. A method of creating a realistic radar target signature on a moving airborne simulation platform as seen by a distant radar set by compensating for the motion of the airborne platform comprising the steps of
   (a) placing three pairs of radar antennas on the moving simulation platform, each pair having first and second radar antennas, each of the plurality of pairs of radar antennas being disposed so that each pair is substantially noncollinear with any other pair
   (b) placing at least one sensing means on the moving simulation platform and detecting the direction of an incoming radar signal received from the distant radar set
   (c) selecting, responsive to the sensing means, two of the plurality of pairs of the antennas, each pair of which is not substantially collinear with the radar set, and
   (d) for each of the two selected pairs
      (1) receiving radar signals from the radar set on the first and second radar antennas to provide first and second received radar signals
      (2) delaying the first and second received radar signals by at least one delay time to provide at least one set of first and second delayed signals responsive to the first and second received signals, respectively and
      (3) transmitting simulated target signals from the first and second antennas on the moving platform which are responsive to each set of second and first delayed signals, respectively, whereby, for each of the two selected pairs of antennas, the signal intercepted by one antenna is retransmitted by the other, and vice versa, so that the total path lengths between the simulation platform and the distant radar set for the two signals will be identical, regardless of the relative geometry between the simulation platform and the distant radar set.

30. The method of claim 29 wherein the first and second radar antennas of each pair of radar antennas placed on the simulation platform are placed so that the midpoint therebetween is approximately at the center of gravity, or the center of stability, of the simulation platform in order to effect the compensation of the platform motion.

31. The method of claim 29 wherein the step of subparagraph (2) of step (d) comprises the step of delaying the first and second radar signals by a plurality of predetermined delay times to provide an equal plurality of sets of first and second delayed signals, respectively, to simulate a three dimensional target.

32. A method of simulating a radar target on a moving simulation platform as seen by a distant radar set comprising the steps of
   (a) placing first and second radar antennas on the simulation platform so as to be substantially noncollinear with the radar set (b) placing a sensing means on the simulation platform to sense the angle between the platform coordinates and the radar signals being received
(c) receiving radar signals from the radar set on the first and second radar antennas on the simulation platform to provide the first and second received radar signals
(d) amplifying said first and second received radar signals to provide the set of first and second amplified signals responsive to the first and second received signals, respectively
(e) delaying said first and second amplified signals to provide the set of first and second delayed signals responsive to the first and second amplified signals, respectively, and
(f) transmitting simulated target signals from the first and second antennas on the simulation platform which are responsive to each set of second and first delayed signals respectively, the simulated target signals transmitted from the first and second antennas each being controlled to simulate the glint and scintillation characteristics of the simulated target, the amplitude of the simulated target signals being controlled in a manner further dependent upon the angle sensed by the sensing means, whereby the simulated target signals will simulate the glint and scintillation characteristics of the simulated target in the same flight path as the simulation platform, and whereby the signal intercepted by one antenna is retransmitted by the other, and vice versa, so that the total path lengths between the simulation platform and the distant radar set for the two signals will be identical, regardless of the relative geometry between the simulation platform and the distant radar set.

33. A method of simulating a radar target on a moving simulation platform as seen by a distant radar set comprising the steps of
(a) placing first and second radar antennas on the simulation platform so as to be substantially noncollinear with the radar set
(b) receiving radar signals from the radar set on the first and second radar antennas on the simulation platform to provide the first and second received radar signals
(c) amplifying said first and second received radar signals to provide the set of first and second amplified signals responsive to the first and second received signals, respectively
(d) delaying the first and second radar signals by a plurality of delay times to provide an equal plurality of sets of first and second delayed signals, each set being responsive to the first and second amplified signals, respectively, to simulate range extent
(e) transmitting simulated target signals from the first and second antennas on the simulation platform which are responsive to each set of second and first delayed signals, respectively, the simulated target signals transmitted from the first and second antennas each being controlled to simulate glint and scintillation characteristic of the simulated target throughout the simulated range extent, whereby the signal intercepted by one antenna is retransmitted by the other, and vice versa, so that the total path lengths between the simulation platform and the distant radar set for the two signals of each set will be identical, regardless of the relative geometry between the simulation platform and the distant radar set.

34. A method of simulating a radar target on a moving simulation platform as seen by a distant continuous wave radar set comprising the steps of
(a) placing first and second radar antennas on the simulation platform so as to be substantially noncollinear with the radar set
(b) receiving radar signals from the radar set on a sampled basis on the first and second radar antennas on the simulation platform to provide the first and second received radar signals
(c) amplifying said first and second received radar signals to provide the set of first and second amplified signals responsive to the first and second received signals, respectively
(d) delaying said first and second amplified signals to provide the set of first and second delayed signals responsive to the first and second amplified signals, respectively, and
(e) transmitting between the samples of step (b), simulated target signals from the first and second antennas on the simulation.platform which are responsive to each set of second and first delayed signals, respectively, whereby the signal intercepted by one antenna is retransmitted by the other, and vice versa, so that the total path lengths between the simulation platform and the distant radar set for the two signals will be identical, regardless of the relative geometry between the simulation platform and the distant radar set.

35. The method of claim 34 wherein the transmitting time of step (e) is substantially greater than the sampling time of step (b).

36. A method of simulating a radar target on a moving simulation platform as seen by a distant continuous wave radar set comprising the steps of
(a) placing three radar antennas on the simulation platform so as to be substantially noncollinear with each other
(b) placing a sensing means on the simulation platform and detecting the direction of an incoming radar signal reviewed from the distant radar set
(c) selecting two antennas from the three antennas on the simulation platform, designated as the first and second radar antennas responsive to the sensing means so that the two selected antennas are substantially noncollinear with the radar set
(d) receiving radar signals from the radar set on a sampled basis on the first and second radar antennas to provide first and second received radar signals
(e) delaying the first and second received radar signals to provide at least one set of first and second delayed signals responsive to the first and second received signals, respectively and
(f) transmitting between the samples of step (d), simulated target signals from the first and second antennas on the moving platform which are responsive to each set of second and first delayed signals, respectively, the simulated target signals transmitted from the first and second antennas are each controlled to simulate the glint and scintillation characteristics of the simulated target whereby, for the selected two antennas, the signal intercepted by one antenna is retransmitted by the other, and vice versa, so that the total path lengths between the simulation platform and the distant radar set for the two signals will be identical, regardless of the relative geometry between the simulation platform and the distant radar set.

37. The method of claim 36 wherein the transmitting time of step (f) is substantially greater than the sampling time of step (d).

38. A method of simulating a radar target on a moving simulation platform as seen by a distant radar set comprising the steps of
   (a) placing a plurality of pairs of radar antennas on the simulation platform, each pair having first and second radar antennas, each of the plurality of pairs of radar antennas being disposed so that each pair is substantially noncollinear with any other pair
   (b) placing at least one sensing means on the simulation platform and detecting the direction of an incoming radar signal received from the distant radar set
   (c) selecting, responsive to the sensing means, at least one of the plurality of pairs of the antenna, which selected at least one pair of antennas are not substantially collinear with the radar set, and
   (d) for each of the at least one selected pair
      (1) receiving radar signals from the radar set on the first and second radar antennas to provide first and second received radar signals
      (2) delaying the first and second received radar signals by at least one delay time to provide at least one set of first and second delayed signals responsive to the first and second received signals, respectively and
      (3) transmitting simulated target signals from the first and second antennas on the moving platform which are responsive to each corresponding set of second and first delayed signals, respectively, the simulated target signals transmitted from the first and second antennas each being characteristics of the simulated target, the amplitude and phase of the simulated target signals controlled in a manner further dependent upon the angle sensed by the sensing means, whereby the simulated target signals will simulate the glint and scintillation characteristics of the simulated target in the same flight path as the simulation platform, and whereby, for each selected pair of antennas, the signal intercepted by one antenna is retransmitted by the other, and vice versa, so that the total path lengths between the simulation platform and the distant radar set for the two signals will be identical, regardless of the relative geometry between the simulation platform and the distant radar set.

39. A method of simulating a radar target on a moving simulation platform as seen by a distant continuous wave radar set comprising the steps of
   (a) placing a plurality of pairs of radar antennas on the simulation platform, each pair having first and second radar antennas, each of the plurality of pairs of radar antennas being disposed so that each pair is substantially noncollinear with any other pair
   (b) placing at least one sensing means on the simulation platform and detecting the direction of an incoming radar signal received from the distant radar set
   (c) selecting, responsive to the sensing means, at least one of the plurality of pairs of the antenna, which selected at least one pair of antennas are not substantially collinear with the radar set, and
   (d) for each of the at least one selected pair
      (1) receiving radar signals from the radar set on the first and second radar antennas on a sampled basis to provide first and second received radar signals
      (2) delaying the first and second received radar signals by at least one delay time to provide at least one set of first and second delayed signals responsive to the first and second received signals, respectively and
      (3) transmitting between the samples of subparagraph (1) of step (d), simulated target signals from the first and second antennas on the moving platform which are responsive to each corresponding set of second and first delayed signals, respectively, whereby, for each selected pair of antennas, the signal intercepted by one antenna is retransmitted by the other, and vice versa, so that the total path lengths between the simulation platform and the distant radar set for the two signals will be identical, regardless of the relative geometry between the simulation platform and the distant radar set.

40. The method of claim 39 wherein the transmitting time is substantially greater than the sampling time.

41. A method of simulating a radar target on a moving simulation platform as seen by a distant radar set comprising the steps of
   (a) placing two pair of radar antennas on the simulation platform, each pair having first and second radar antennas, each pair of radar antennas being disposed so that each pair is substantially noncollinear with any other pair and with the distant radar set
   (b) placing a sensing means on the simulation platform to sense the angle between the platform coordinates and the radar signals being received
   (c) for each of the pair of antennas
      (1) receiving radar signals from the radar set on the first and second radar antennas to provide first and second received radar signals
      (2) delaying the first and second received radar signals by at least one delay time to provide at least one set of first and second delayed signals responsive to the first and second received signals, respectively and
      (3) transmitting simulated target signals from the first and second antennas on the moving platform which are responsive to each set of second and first delayed signals, respectively, the simulated target signals transmitted from the first and second antennas are each being controlled to simulate the glint and scintillation characteristics of the simulated target in at least two dimensions, the amplitude and phase of the simulated target signals being controlled in a manner further dependent upon the angle sensed by the sensing means, whereby the simulated target signals will simulate the glint and scintillation characteristics of the simulated target in at least two dimensions and in the same flight path as the simulation platform, and whereby, for each pair of antennas, the signal intercepted by one antenna is retransmitted by the other, and vice versa, so that the total path lengths between the simulation platform and the distant radar set for the two signals will be identical, regardless of the relative geometry between the simulation platform and the distant radar set.

42. A method of simulating a radar target on a moving simulation platform as seen by a distant continuous wave radar set comprising the steps of
  (a) placing two pair of radar antennas on the simulation platform, each pair having first and second radar antennas, each pair of radar antennas being disposed so that each pair is substantially noncollinear with any other pair and with the distant radar set
  (b) for each of the pair of antennas
    (1) receiving radar signals from the radar set on the first and second radar antennas on a sampled basis to provide first and second received radar signals
    (2) delaying the first and second received radar signals by at least one delay time to provide at least one set of first and second delayed signals responsive to the first and second received signals, respectively and
    (3) transmitting between the samples of subparagraph (1) of step (b), simulated target signals from the first and second antennas on the moving platform which are responsive to each set of second and first delayed signals, respectively, whereby, for each pair of antennas, the signal intercepted by one antenna is retransmitted by the other, and vice versa, so that the total path lengths between the simulation platform and the distant radar set for the two signals will be identical, regardless of the relative geometry between the simulation platform and the distant radar set.

43. The method of claim 42 wherein the transmitting time is substantially greater than the sampling time.

* * * * *